July 14, 1931.　　　　J. E. MITCHELL　　　　1,814,761
COMBINED HARVESTING AND COTTON CLEANING MACHINE
Filed May 4, 1927　　　3 Sheets-Sheet 1
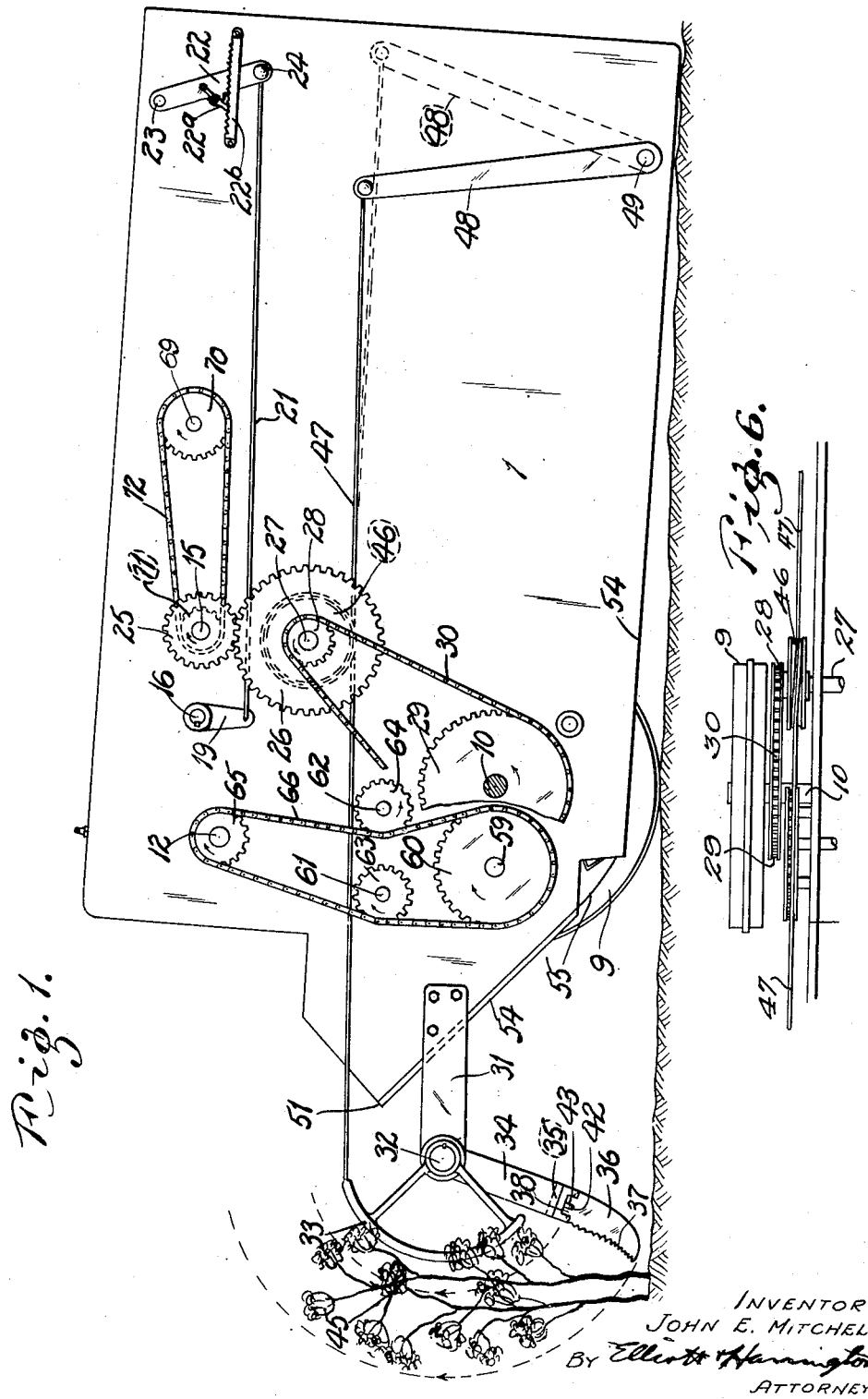
INVENTOR:
JOHN E. MITCHELL
By Elliott Harrington
ATTORNEYS July 14, 1931.  J. E. MITCHELL  1,814,761
COMBINED HARVESTING AND COTTON CLEANING MACHINE
Filed May 4, 1927   3 Sheets-Sheet 2
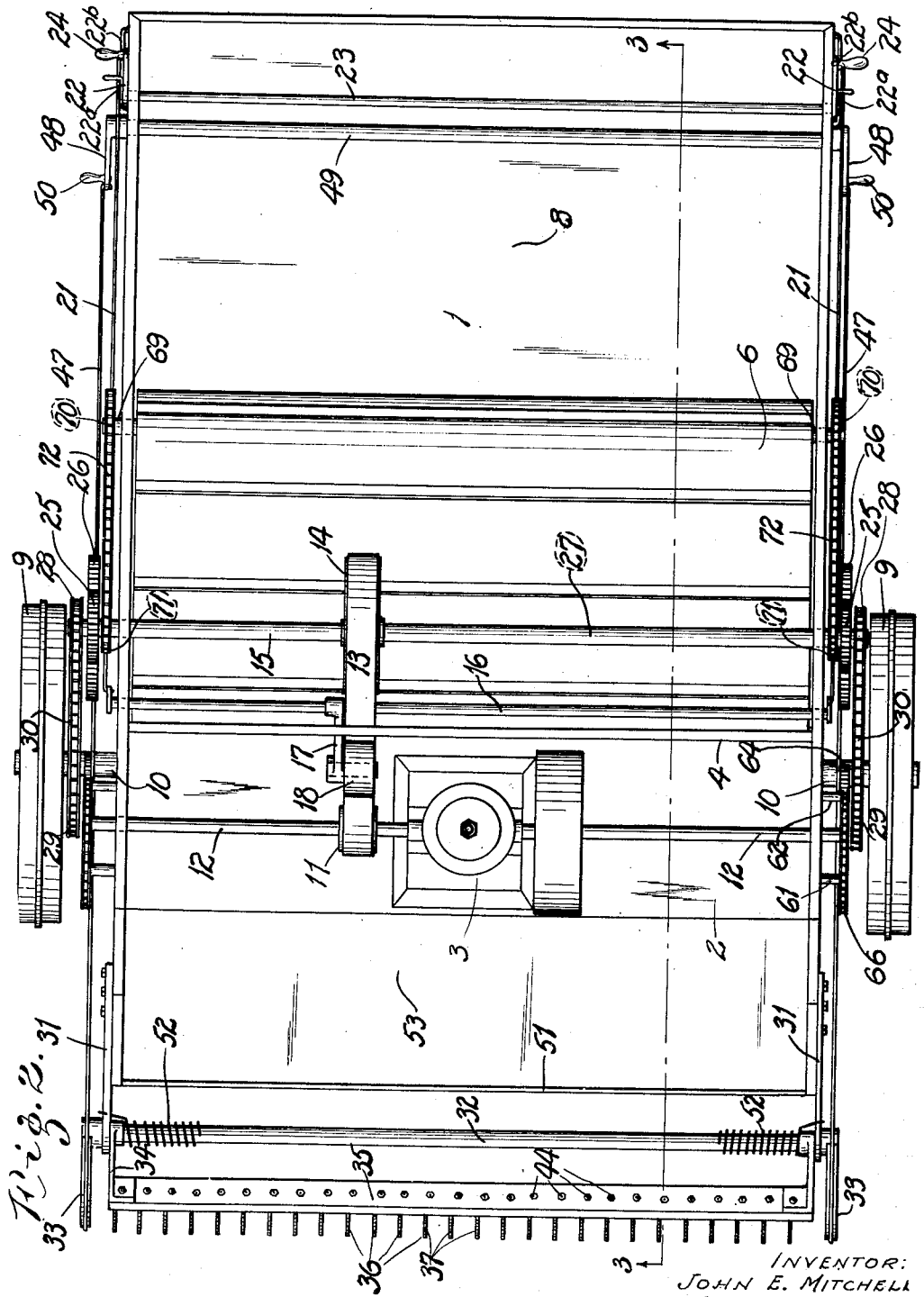
INVENTOR:
JOHN E. MITCHELL
By Elliott Harrington
ATTORNEYS

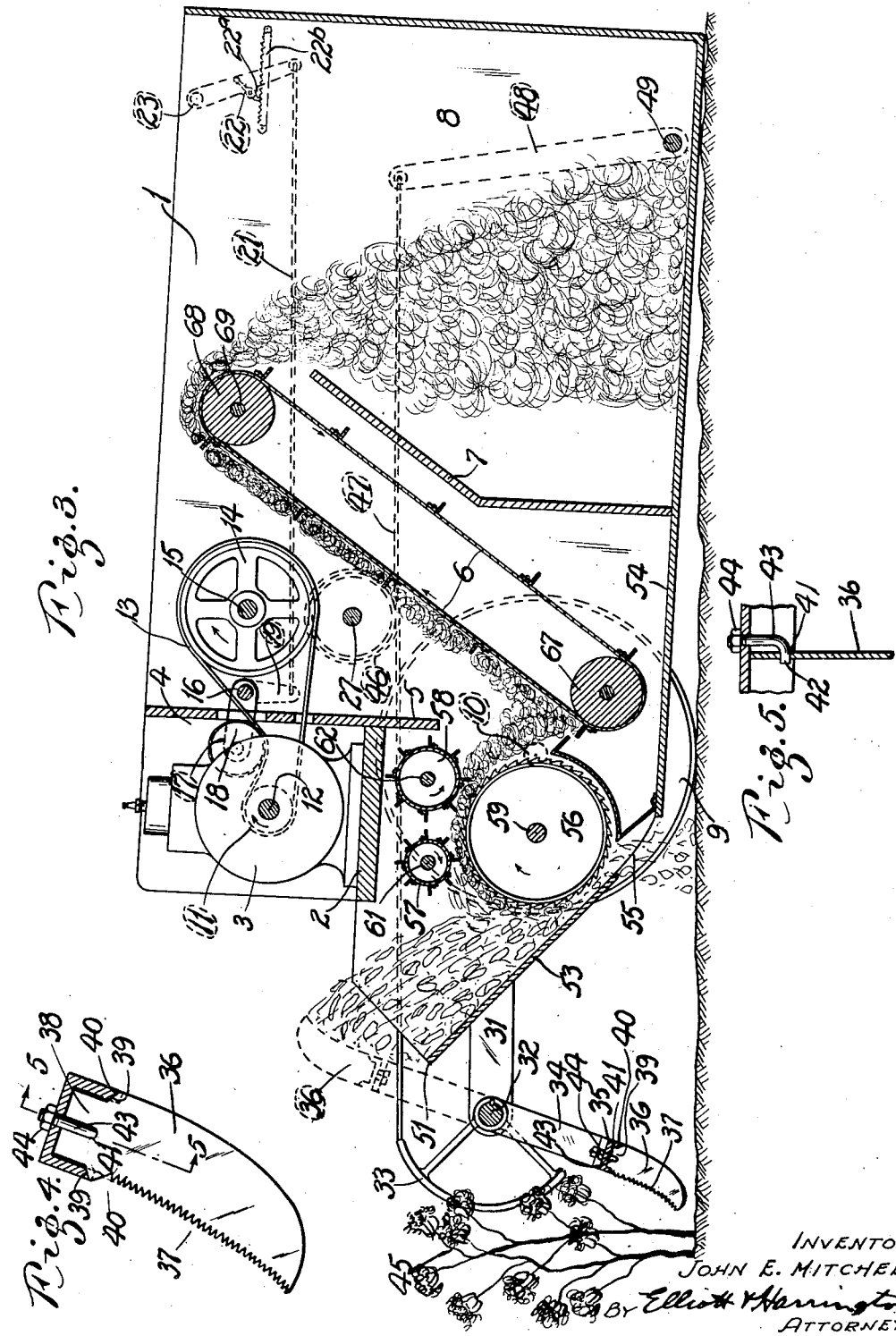

Patented July 14, 1931

1,814,761

UNITED STATES PATENT OFFICE

JOHN E. MITCHELL, OF ST. LOUIS, MISSOURI

COMBINED HARVESTING AND COTTON CLEANING MACHINE

Application filed May 4, 1927. Serial No. 188,648.

This invention relates to a self-propelled combined cotton harvesting and cleaning machine.

In certain parts of the country, notably on the plains in the western parts of Texas, the gathering of the cotton is effected at considerable loss of cotton owing to the fact that it is difficult to secure cotton pickers, and resort is had to comparatively crude machines which are drawn, usually by mules, over the rows of cotton, and equally crude means are mounted on the machine for stripping the cotton from the plants as the machine is drawn over them. The devices that have been used for stripping cotton are usually in the form of relatively thick smooth metal bars mounted parallel to provide spaces between the bars, so that when the bars are at an angle lengthwise along the row of cotton, the stalks or stems of the cotton plant are supposed to slip through the spaces between the bars, while the bars themselves are close enough together to engage or strip the cotton or bolls from the stalks.

This method of stripping cotton from the stalks, however, has not been satisfactory for the reason that with the ordinary stripping bars heretofore used, it has been impossible to place them close enough together to prevent the waste of a great deal of cotton through the spaces between the bars, and at the same time have the spaces wide enough to avoid breaking off or stripping with the cotton an excessive amount of stalks or stems.

As a result, the harvested cotton not only contains an excessive amount of the stalks or stems, which renders the subsequent cleaning of the cotton at the gin a matter of great difficulty, but a large percentage of the cotton is wasted by slipping through the spaces between the bars. In addition to the difficulty of cleaning cotton so harvested, the continuous removal of so much stalks and twigs from the ground results in the gradual impoverishment of the land, as the cotton plant is fairly rich in potash; and, moreover, there is great need for the incorporation of this vegetable matter into the soil to stabilize the latter.

The machine of the present invention, therefore, is particularly designed for use in sections where hand-picking of cotton is impracticable, and is directed to the provision of means for enabling the cotton to be stripped from the plants without the great loss of cotton which has attended the use of the machines now employed, and by having cotton cleaning mechanism combined therewith, to permit the hulls, stalks and stems of the plant which may be gathered with the cotton and which have heretofore been removed, to be returned to the ground, thus adding to the fertility and stability of the latter and preventing the loss entailed by the transportation of a large mass of refuse matter over great distances to the gin.

The general object of the present invention is to provide a machine for harvesting and cleaning cotton which may be propelled over the ground, and which shall have combined therewith novel means for stripping the cotton from the standing plants. In operation, the machine is driven crosswise of the rows of cotton, and controlling means are provided whereby the operator may cause the cotton stripping member to be intermittently operated to remove the cotton and bolls from a section of the standing plants of each row as the machine progresses and deliver the gathered cotton to the cotton cleaning element of the machine.

A further object of the invention is to provide a novel cotton stripping member designed to effectively strip the cotton and bolls from the standing plants and to deliver the same to the cotton cleaning mechanism on the machine.

Another object of the present invention resides in providing the cotton stripping member with cotton engaging blades having saw-toothed edges.

In my improved stripping member, I employ steel blades, thin enough to have saw teeth cut on the stripping edge. Since the teeth positively engage the cotton to prevent it from slipping through the spaces between the blades, these spaces can be made much wider than would be practicable in the use of the smooth bars above referred to. In other words, in my improved stripping member, the spaces between the blades are wide enough to permit the stalks or stems slipping through freely while the teeth on the upper or stripping edge of the blades prevent the cotton going through.

Aside from the improvements in results made possible by the wider spaces, to permit the stalks and stems to slide freely between the blades, which is made possible by the saw teeth on the stripping edge for positively engaging the cotton, I have been able to bring about a further improvement in results obtained by making my stripping member of considerable length and operating it so as to have it engage through its entire length the rows of cotton sidewise, which permits the blades to engage the cotton and bolls with the least entanglement with the stalks and stems of the cotton plant.

The ordinary stripping devices referred to, made up of spaced bars or fingers, are comparatively narrow and are necessarily forced at much greater speed lengthwise along a row of cotton. This confining of the operation to such a narrow space, necessitating the stripper being forced along at a comparatively high speed, results in the stalks and stems being bent over and matted together in such a way that it is impossible to strip the cotton without breaking off a large amount of the stalks and stems which, as stated, are very difficult to separate from the cotton. In other words, even with my improved stripping member, with the wider spaces between the blades, the results obtained by operating lengthwise of the row, will not be so good by reason of so much work being confined to but a few of the stripping blades, while, on the other hand, by operating crosswise of the rows of cotton, the stripping member can be made long enough to be the equivalent of operating on two or three rows of cotton at a time in the other direction. This permits a much slower operation to obtain the same harvesting capacity, and at the same time each stripping blade through the entire length of the stripping member has practically the same work to do. Furthermore, there is comparatively little matting or massing of the stalks or stems together and consequently fewer are broken or pulled off with the cotton.

An additional advantage in operating the machine crosswise of the rows instead of lengthwise resides in the fact that, as the cotton stripping member is of substantially the same width as the saw cylinder of the cotton cleaning mechanism, in each cotton stripping operation, the cotton is delivered substantially uniformly throughout the entire length of the saw cylinder. If my machine were operated lengthwise of the rows, and assuming the stripper to be approximately six feet in length, ordinarily three rows of cotton would be embraced within its operation, but it will be apparent that only those portions of the cotton stripper corresponding to the width of the plants in the three rows would be gathering cotton, and thus the gathered cotton would be delivered to the surface of the saw cylinder only at the center and ends of the latter, instead of over its entire surface. This would result in lowering the efficiency and capacity of the cleaning machine.

The invention is illustrated in the accompanying drawings, in which—

Figure 1 is a view in side elevation of my improved machine;

Figure 2 is a plan view of the same;

Figure 3 is a longitudinal sectional view thereof on the line 3—3 of Fig. 2;

Figure 4 is a cross-sectional view on an enlarged scale through the channel bar of the cotton stripping member showing one of the saw-toothed fingers used on said elements;

Figure 5 is a section on the line 5—5 of Fig. 4; and

Figure 6 is a detail view of the friction drum for winding the cable which operates the cotton stripping member and also showing certain associated parts.

Referring now to the drawings, the numeral 1 indicates the main body of the machine which is substantially rectangular in shape and has mounted toward its forward end on a platform 2, a motor 3 which provides the power for propelling the machine and for operating the cotton stripper. A partition 4 having a depending guard 5 extending below the platform 2 serves to separate the space occupied by the motor from an intermediate space occupied by a cotton elevator 6. To the rear of this cotton elevator is provided a partition 7 which, with the rear wall of the body 1, provides a receptacle 8 for the gathered cotton delivered by the elevator 6. The body 1 is supported toward its forward end on wheels 9 mounted on stub shafts 10, the rear end of the body 1 being designed to drag on the ground. The machine is designed to be propelled from the motor 3 by the following mechanism:

Passing over a driving pulley 11 (Fig. 2) mounted on a transverse shaft 12 extending entirely across the machine and operated by the motor 3, is a belt 13 which passes over a pulley 14, mounted on a transverse shaft 15, also extending entirely across the machine. The belt 13 is designed to be tightened to cause the propulsion of the machine by means of a belt-tightener. This belt-tightener comprises a transverse shaft 16 journaled in the side walls of the body 1 and having secured thereon intermediate its ends a crank arm 17 on the outer end of which is rotatably mounted a roller 18 designed to bear upon the upper side of the belt 13 in the space between the two pulleys 11 and 14. On each end of the shaft 16 there is mounted a lever 19, the outer end of which is pivotally connected to one end of a pull rod 21, the other end of which is secured to the lower end of a lever arm 22 secured at its upper end on one end of a transverse shaft 23 and provided at its lower end with an operating handle 24. An operator standing on either side of the machine, by grasping the handle 24 and moving it backward, or to the position shown in Fig. 3, can thereby lower the roller 18 to tighten the belt 13 so that it will frictionally engage the pulleys 11 and 14 and thereby cause the machine to be propelled forwardly through the driving mechanism to be described. A pawl 22a on lever arm 22 co-operating with a ratchet bar 22b mounted on the side of the body 1, will hold the roller 18 in this position. When it is desired to stop the machine, the pawl is raised and the lever arm 22 moved in the opposite direction, thereby raising the roller 18 out of contact with belt 13 so that the latter will run loose and no longer drive the pulley 14.

This driving mechanism comprises pinions 25, one of such pinions being mounted on each end of the transverse shaft 15 (Fig. 1) and meshing with gears 26, one of such latter gears being mounted on each end of a transverse shaft 27. Mounted on each end of the shaft 27 is a sprocket wheel 28, and mounted on each of the stub shafts 10 is a larger sprocket wheel 29. The stub shafts 10 are suitably journaled in the side walls of the machine. Passing over the two sets of sprocket wheels 28 and 29 at each side of the body 1 is a sprocket chain 30. It will thus be seen that when the shaft 15 is caused to be rotated by the belt 13, the wheels 9 will be turned through the action of sprocket chains 30, driven through the medium of the gears 25 and 26, the sprocket wheels 28 and 29, and the sprocket chains 30.

My improved cotton stripping member is mounted on the forward end of the machine and will now be described.

Secured at its inner end to the side wall of the machine at each side of the latter is an arm 31, which arms project forwardly of the machine in a horizontal direction, as shown by Figs. 1 and 2, and have journaled in their outer ends a transverse shaft 32, on each end of which is secured an arcuate member, or sector, 33. Adjacent each of the arms 31, I secure on the shaft 32 one end of a bracket arm 34, the lower end of each of said bracket arms being secured to the outer end of a transverse channel bar 35 (Fig. 2). Mounted in the channel bar 35 in spaced parallel relation are a number of cotton engaging blades 36, one of which is shown in detail on an enlarged scale in Fig. 4. Each of these cotton engaging blades comprises a flat and preferably curved strip of metal, approximately one-eighth of an inch thick, having its forward edge provided with saw teeth indicated at 37, and provided at its upper end with a reduced portion 38 adapted to fit snugly in the channel of the bar 35 and affording shoulders 39 which are adapted to rest upon the bottom of grooves 40 which are formed by a suitable milling tool at desired intervals throughout the length of the channel bar 35 in the outer edges of its two sides. Each of the blades 36 is provided in the reduced portion 38 with an aperture 41 adapted to receive the hooked end 42 (Fig. 5) of a bolt 43, the screwthreaded end of which is passed through an opening in the base of the channel bar and has applied thereto a nut 44 by screwing up which each of the blades 36 may be brought into and maintained in firm engagement with the channel bar. As shown by Figs. 1 and 3, the blades 36 are pendent from the channel bar 35, their lower ends being normally positioned relatively close to the ground. Assuming the cotton stripper, comprising the blades 36, to have been brought by the advance of the machine in contact with or proximity to a number of cotton plants in a row, such as indicated in Figs. 1 and 3 by the numeral 45, it is next necessary to impart a forward and upward movement to the blades 36 in order that they may pass between the stalks and branches of the plants and strip the cotton therefrom. This movement is effected by the following means:

Mounted on the transverse shaft 27 near the outer end thereof is a fixed drum 46. The numeral 47 indicates cables each of which is given a turn about a corresponding drum 46 and has one end carried forwardly and passed over the periphery of one of the sectors 33 and secured to the lower side of said sector, and its other end carried rearwardly and secured to the upper end of a lever 48, said levers 48 being secured, respectively, at their lower ends to the outer ends of a transverse shaft 49 (Fig. 2), suitably journaled in the side walls of the machine. Each of the levers 48 is provided at its upper end with an operating handle 50. The drums 46, being on the shaft 27, are continuously driven. When it is desired to impart a forward and upward movement to the stripping blades 36, the operator seizes one or the other of the handles 50 and draws the lever 48 rearwardly, thereby causing the cables 47 to frictionally engage the drums 46, and as this pull is continued, the forward end of each cable will be wound upon its drum as the operator pulls on the rear ends of the cables. The pull of the cables on the sectors 33 causes the shaft 32 to rotate, thereby moving the cotton stripping member, comprising the bracket arms 34, channel bar 35 and stripping blades 36, forward, upward and backward, or imparting a circular motion to the same, which movement is continued until the bracket arms 34 engage the forward edge of the body 1, indicated in Figs. 1 and 2 by the numeral 51, causing the cotton carried by the stripping blades to be discharged into the cotton cleaning machine. As soon as this occurs, the operator releases the handle 50 so that the cotton stripper may return to its normal downward position. This latter movement is effected largely by gravity, but the initial return movement may be produced by means of coil springs 52 secured to the shaft on one end and to the bracket arms 31 at the other.

As the blades 36 pass upwardly through the cotton plants, they will operate to strip practically all of the cotton therefrom, and this cotton will be engaged by the saw teeth 37 and be prevented from slipping between the blades. Suitable means may be provided for removing adhering cotton from the stripping blades when the latter has been raised to the position shown in dotted lines in Fig. 3, but I do not consider it necessary to show such means, and it may be assumed that any adhering cotton will be removed by the operator, as is the case in the machines now in use.

In Fig. 1, I have indicated by dotted lines the curved path taken by the stripping blades 36 in passing through the cotton plants. In this movement, it will be seen that any of the cotton bolls projecting inward beyond the channel bar 35 will be engaged by the channel bar in the upward movement of the cotton stripper and be forced into the zone of movement of the stripping blades 36. Thus, all of the cotton on the plants will be subjected to the action of the said stripping blades.

The cotton cleaning unit comprises a hullboard 53 which is provided by simply imparting an inclined position to the forward end of the body 1. This hullboard terminates short of the bottom 54 of the body 1, providing an opening 55 through which hulls and trash may escape. Mounted adjacent to the hullboard near the lower end thereof is a saw cylinder 56, and above this is mounted a kicker roll 57 for knocking back hulls and trash from the cotton carried around by the saw cylinder, and beyond the kicker roll, in a rearward direction, is a doffer 58. These elements of a cotton cleaning machine are disclosed in various of my prior patents, and as their construction and operation are well known, no further description thereof is deemed necessary.

The shaft 59 of the saw cylinder is journaled at each end in the side walls of the machine, and at each end is provided with a sprocket wheel 60. Extending transversely of the machine above the saw cylinder are shafts 61 and 62, the former being the shaft of the kicker roll 57, and the latter of the doffer 58. The shafts 61 and 62 are journaled in opposite side walls of the body 1 and at each of their ends are provided with a sprocket wheel, the sprocket wheels of the shaft 61 being indicated by the numerals 63 and the sprocket wheels of the shaft 62, by the numerals 64. Secured on each end of the motor shaft 12 is a sprocket wheel 65. A sprocket chain 66 passes over the sprocket wheels 60 and 65 and engages the teeth of the sprocket wheels 63 and 64 at corresponding sides, as indicated by Fig. 1. By the means just described, the saw cylinder, kicker roll, and doffer are rotated in appropriate directions from the shaft of the motor 3.

While the precise location of the cotton cleaning mechanism is not of the essence of the invention, I find it convenient, in the present arrangement, to locate it in the manner illustrated, with the saw cylinder positioned near the bottom of the body of the machine. With such an arrangement, it is desirable to elevate the cotton and discharge it into a receptacle partitioned from the operating mechanism of the machine. To this end, I provide the endless elevator 6, previously referred to, which is of a conventional construction and supported by rollers 67 and 68 located, respectively, near the bottom and top of the body 1 and journaled in the side walls of said body. The shaft 69 of the upper roller 68 has secured on each of its ends a sprocket wheel 70, and the transverse shaft 15, previously referred to, has secured on each of its ends a small sprocket wheel 71 (Fig. 2). Over the sprocket wheels 70 and 71 is passed a sprocket chain 72 (Figs. 1 and 2). The elevator 6 is therefore rotated from the shaft 15 which, as previously described, will be rotated from the motor shaft 12 through the medium of the belt 13.

The machine described may be of any practicable width, but in actual use, I contemplate a width which will enable the cotton stripper to operate upon from five to six feet of the plants in each row in succession.

In the preferred operation of the device, the belt 13 being tightened in the manner described, the machine is propelled crosswise of the rows of cotton to bring the stripper in position to engage the plants of successive rows, as shown by Figs. 1 and 3. As the cotton stripper reaches each row, the operator seizes one or the other of the handles 50, and by pulling on the cable 47, causes the blades 36 to be forced through the cotton plants of such row and to strip the cotton and bolls from the stalks. The pull on the cable is continued until the cotton stripping member, by striking the forward edge 51 of the hullboard 53, is caused to discharge the gathered cotton into the forward end portion of the machine which, in effect, constitutes a hopper for feeding the cotton to the cleaning mechanism. In the operation of the latter, the hulls, stalks, and the like, are discharged through the opening 55 onto the ground and the cotton delivered by the doffer 58 to the elevator 6 which, in turn, discharges it into the receptacle or trailer 8. After the gathered cotton has been discharged into the machine as described, the operator releases the pull on the levers 48, which consequently releases frictional engagement of the cable 47 with the drum 46, and the coil springs 52 will then return the cotton stripping member to its downward position, which operation is, of course, assisted by gravity. During the time the cotton stripping member is returning to the downward position, the machine will have reached a position to operate upon a section of the plants of the next row.

It will be understood that the invention is not limited to the precise details of construction described and illustrated, and various arrangements of driving mechanism, controls therefor, and different means for rotating the cotton cleaning elements from the motor, and for elevating the cotton stripping member, could be adopted without departing from the principle of my invention.

It should also be stated, in explanation of the semi-automatic means for actuating the cotton stripping member described, that while, in theory, it would be possible to provide automatic means, entirely mechanical in operation, for actuating the cotton stripping member intermittently in synchronism with the approach of the machine to and its passage over each row in succession, in practice such operation is not feasible for the reason that the distance between the rows of cotton will vary on different plantations, and even on the same plantation, and thus it becomes necessary for an operator to manipulate the cotton stripping member at the appropriate intervals.

I claim:

1. A cotton harvesting machine comprising a portable cotton receiving body, means for propelling the same over the ground, a cotton stripping member pivotally mounted on and positioned beyond the forward end of said body, and comprising spaced parallel blades having free ends normally positioned relatively close to the ground, and means for imparting a forward, upward and backward swing to said cotton stripping member about its pivot at will.

2. A cotton harvesting machine comprising a portable cotton receiving body, means for propelling the same over the ground, a cotton stripping member pivotally mounted on and positioned beyond the forward end of the body comprising a series of spaced parallel blades having their front operating edges provided with saw teeth, and having free ends normally positioned relatively close to the ground, and means for imparting a forward, upward and backward swing to said cotton stripping member about its pivot at will.

3. A combined cotton harvesting and cleaning machine comprising a portable cotton receiving body, a pivoted cotton stripping member positioned beyond the forward end of said body and comprising spaced parallel blades having free ends normally positioned relatively close to the ground, a cotton cleaning unit and a motor, mounted on said body, means for driving said cotton cleaning unit from said motor, driving mechanism associated with said motor for propelling the machine over the ground, actuating means operatively associated with said motor for causing a forward, upward and backward swing of the cotton stripping member about its pivot to deliver the gathered cotton to said cotton cleaning unit, and means operable at will for causing the actuation of said cotton stripping member.

4. A combined cotton harvesting and cleaning machine comprising a portable cotton receiving body, a pivoted cotton stripping member positioned beyond the forward end of said body and comprising a series of spaced parallel blades having their forward or operating edges provided with saw teeth and having free ends normally positioned relatively close to the ground, a cotton cleaning unit and a motor mounted on said body, means for driving said cotton cleaning unit from said motor, driving mechanism associated with said motor for propelling the machine over the ground, actuating means operatively associated with said motor for causing a forward, upward and backward swing of the cotton stripping member about its pivot to deliver the gathered cotton to said cotton cleaning unit, and means operable at will for causing the actuation of said cotton stripping member.

5. A combined cotton harvesting and cleaning machine comprising a portable cotton receiving body affording a receptacle, a movable cotton stripping member adapted to deliver the gathered cotton into said body, a cotton cleaning unit and a motor mounted on said body, means for driving said cotton cleaning unit from said motor, driving mechanism associated with said motor for propelling the machine over the ground, actuating means for said cotton stripping member operatively associated with the motor, and means operated from said motor for receiving and delivering the cotton discharged from the cotton cleaning unit into said receptacle.

6. In a cotton harvesting machine, a cotton stripping member pivotally mounted on and positioned beyond the forward end of the machine comprising a plurality of spaced parallel blades, and means for moving said cotton stripping member about its pivot to cause a forward, upward and backward swing of said blades.

7. In a cotton harvesting machine, a cotton stripping member pivotally mounted on and positioned beyond the forward end of the machine comprising a plurality of spaced parallel blades having saw-toothed edges for engaging the cotton, and means for moving said cotton stripping member about its pivot to cause a forward, upward and backward swing of said blades.

8. In a cotton harvesting machine, a cotton stripping member pivotally mounted on and positioned beyond the forward end of the machine comprising a plurality of spaced parallel blades having saw-toothed edges for engaging the cotton, an actuating member secured to said cotton gathering element at its pivotal axis, and means for moving said actuating member to cause a forward, upward and backward swing of the cotton stripping member about its axis.

9. In a cotton harvesting machine, a cotton stripping member pivotally mounted on the forward end of the machine comprising a plurality of spaced parallel blades having saw-toothed edges for engaging the cotton, a cable operatively connected at one end to said cotton stripping member, and means associated with said cable beyond said end for exerting a pull on said cable at will to cause a forward and upward swing of the cotton stripping member about its axis.

10. In a cotton harvesting machine, a cotton stripping member pivotally mounted on the forward end of the machine comprising a plurality of spaced parallel blades having saw-toothed edges for engaging the cotton, a drum and means for driving the same, a cable operatively connected at one end to said cotton stripping member and given a turn about said drum, and means operable at will for exerting a pull on the other end of said cable, whereby to cause the cable to frictionally engage said drum and to be pulled thereby to cause a forward and upward swing of the cotton stripping member about its pivot.

11. In a cotton harvesting machine having a hopper for cotton, a cotton stripping member pivotally mounted on the forward end of the machine comprising a plurality of spaced parallel blades having saw-toothed edges for engaging the cotton, an actuating member secured to said cotton stripping member, means for moving said actuating member to cause a forward and upward swing of the cotton stripping member about its pivot, and a stop for limiting the movement of said cotton stripping member at the forward side of said hopper to cause the cotton carried by said element to be discharged into said hopper.

12. In a cotton harvesting machine adapted to be propelled crosswise of the rows of cotton, a cotton stripping member mounted thereon, and manually-controlled means for operating said member at will, whereby it may be caused to function intermittently in synchronism with the approach of the machine to and its passage over the successive rows of cotton.

13. In a cotton harvesting machine adapted to be propelled crosswise of the rows of cotton, a cotton stripping member pivotally mounted on the forward end of the machine, and means for operating said member intermittently, first to swing it upwardly about its pivot to strip the cotton from the plants as the stripper approaches and passes over each row of cotton, and then to lower it in the space between two rows in position for the next cotton stripping operation.

14. A cotton stripping member provided with means adapting it to be pivotally mounted at its upper end in pendent position on the forward end of a propelled machine whereby it may have imparted thereto an outward, upward and backward movement about its pivot for gathering cotton from the plants and delivering it to the machine, said cotton stripping member comprising a series of parallel blades each of which has a free end portion the outer edge of which is provided with saw teeth.

15. A cotton stripping member provided with means adapting it to be pivotally mounted at its upper end in pendent position on the forward end of a propelled machine whereby it may have imparted thereto an outward, upward and backward movement about its pivot for gathering cotton from the plants and delivering it to the machine, said cotton stripping member comprising a series of parallel blades each of which has a free end portion affording a curved operating edge provided with saw teeth.

16. A cotton stripping member provided with means adapting it to be pivotally mounted at its upper end in a pendent position on the forward end of a propelled machine whereby it may have imparted thereto an outward, upward and backward movement about its pivot for gathering cotton from the plants and delivering it to the machine, said cotton stripping member comprising a channel bar and a series of blades detachably secured therein, each of which has an outer operating edge provided with saw teeth for engaging the cotton.

In testimony whereof, I have hereunto set my hand.

JOHN E. MITCHELL.